J. P. GOOSSEN.
AGRICULTURAL MACHINE.
APPLICATION FILED APR. 14, 1916.

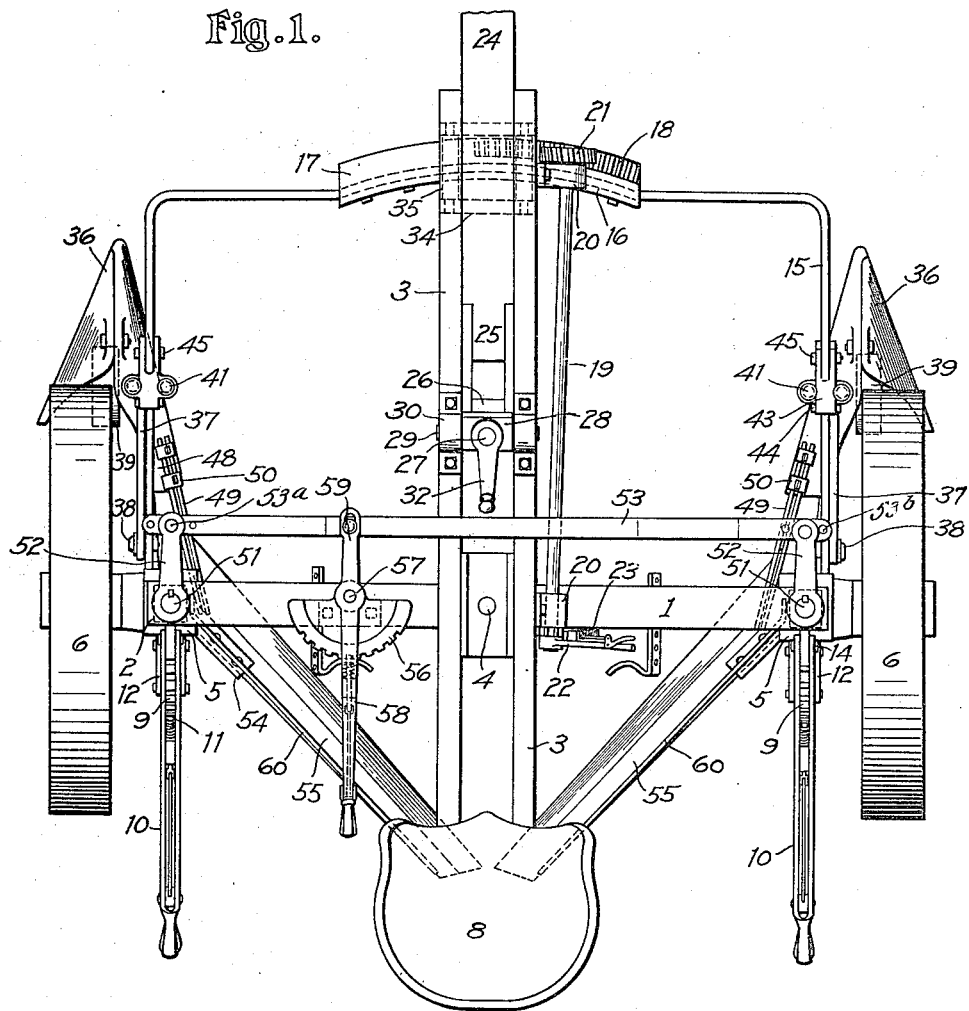

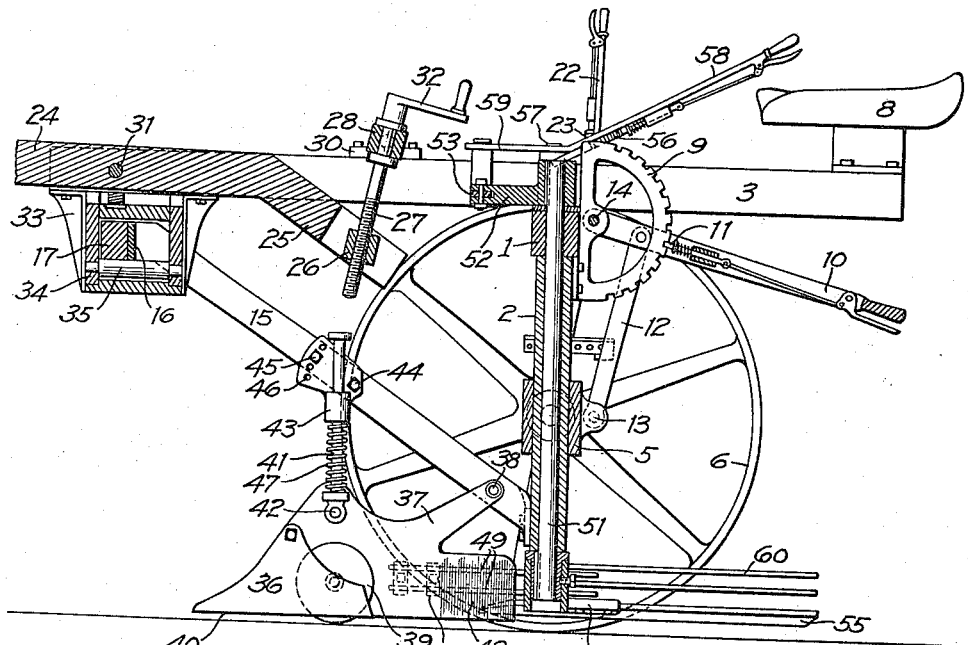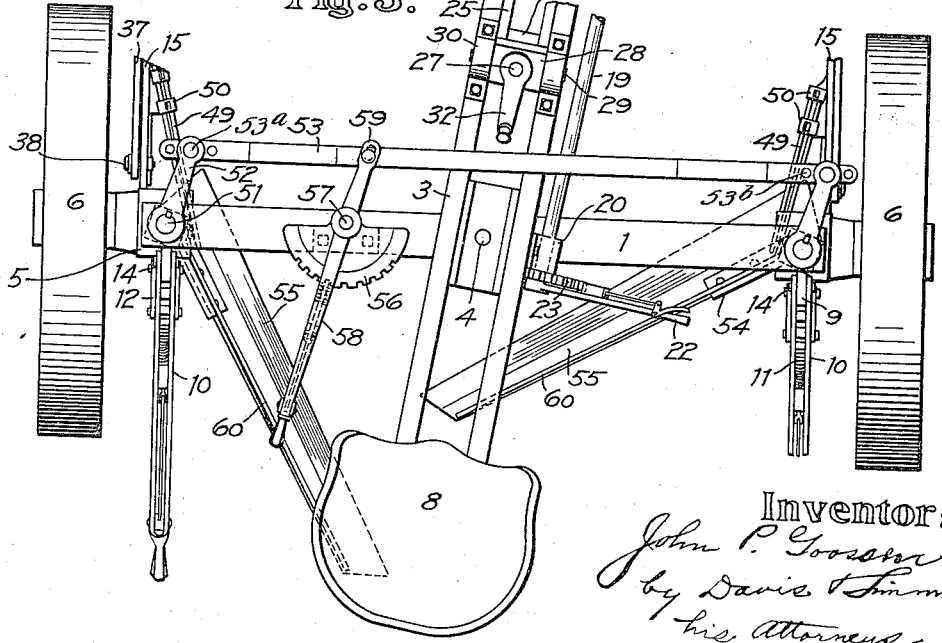

1,195,578.

Patented Aug. 22, 1916.
3 SHEETS—SHEET 3.

Inventor:
John P Goossen
by Davis & Simms
his attorneys

UNITED STATES PATENT OFFICE.

JOHN P. GOOSSEN, OF PALMYRA, NEW YORK.

AGRICULTURAL MACHINE.

1,195,578. Specification of Letters Patent. Patented Aug. 22, 1916.

Application filed April 14, 1916. Serial No. 91,024.

*To all whom it may concern:*

Be it known that I, JOHN P. GOOSSEN, a citizen of the United States, and resident of Palmyra, in the county of Wayne and State of New York, have invented certain new and useful Improvements in Agricultural Machines, of which the following is a specification.

This invention relates to agricultural machines, and one of the objects of the invention is to produce a bean harvester that is readily adaptable to various conditions met with in cutting or harvesting beans, or other plants that grow on comparatively short vines which require to be cut off at or close to the ground.

A further object of the invention is to provide a construction whereby the various required adjustments of the machine may be readily made by the operator without it being necessary for him to leave his driving seat.

A still further object is to provide a construction that enables the machine to operate rapidly and efficiently on the sides of hills.

To these and other ends the invention consists of certain parts and combinations of parts all of which will be hereinafter described, the novel features being pointed out in the appended claims.

Figure 4:
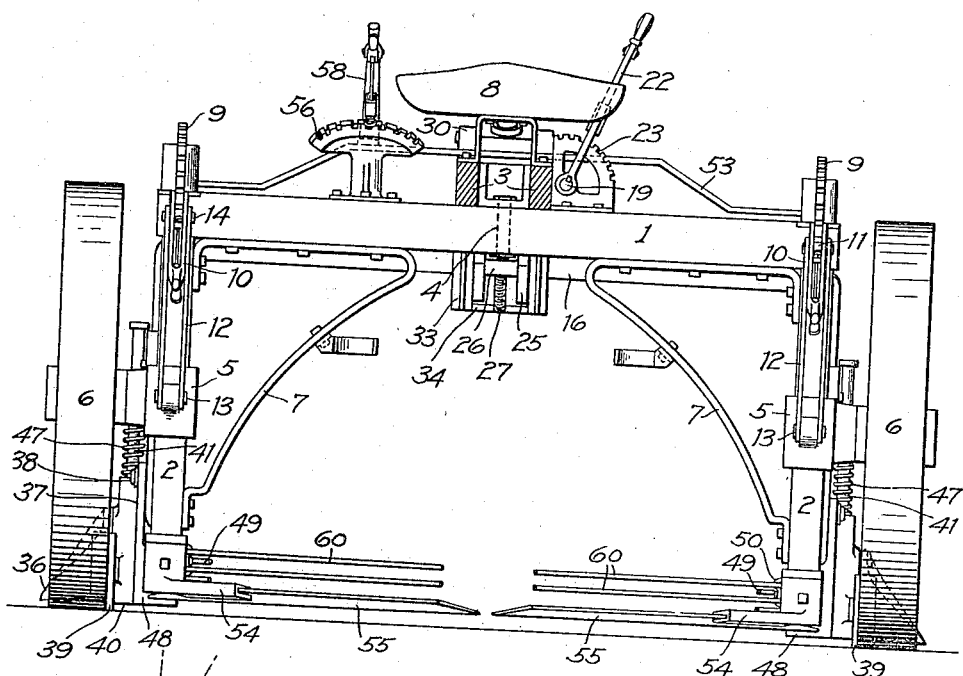
Figure 5:
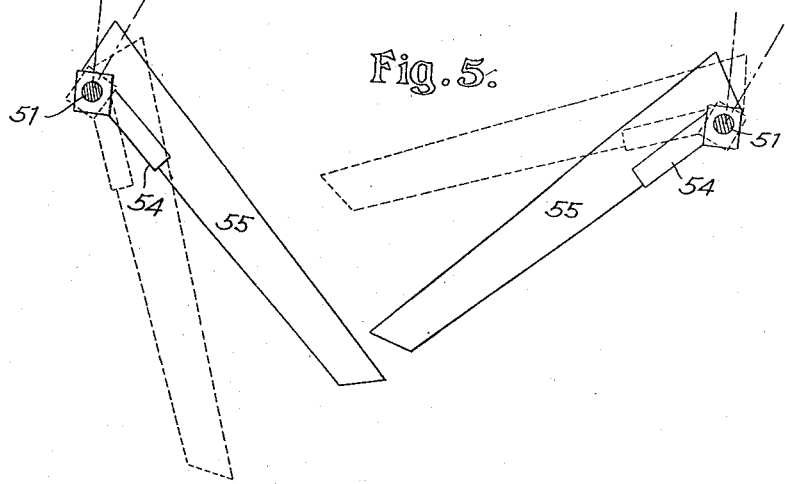

In the drawings which form a part of the specification: Figure 1 is a top plan view of a bean harvester embodying a preferred form of this invention; Fig. 2 is a side elevation, some of the parts being shown in section; Fig. 3 is a partial top plan view showing the machine adjusted differently than shown in Fig. 1; Fig. 4 is a rear elevation; and Fig. 5 is a diagram showing two positions of the vine cutters.

In the construction shown in the drawings the main supporting frame of the machine comprises a transverse horizontal beam 1 and fixed upright posts 2. Two parallel longitudinal bars or frames 3 are pivoted on a king pin 4 at the center of the beam 1. The posts 2 constitute vertical supporting guides for boxes 5 from which project axles on which wheels 6 rotate. The posts 2, besides being fixed at their upper ends in the beam 1, may be suitably reinforced by knee braces 7. The driver's seat 8 may be conveniently located at the rear ends of the longitudinal frames 3, and the various controlling members are so arranged that they are within reach of the driver therefrom.

For raising and lowering the wheels a pair of notched sectors 9 extend rearwardly from the beam 1 for coöperation with latches 11 carried by levers 10. Links 12 depend from the levers 10, and are attached at their lower ends to pivots 13 that project rearwardly from the boxes 5. By this arrangement the operator can raise or lower either side of the machine relatively to the ground, and in order to do this the required lever 10 is moved upwardly to lower the frame of the machine and downwardly to raise it, the upper end of the link 12 serving as a fulcrum about which the machine may be lifted, the pivotal end 14 of the lever 10 being the point of movement.

Extending forwardly and upwardly from the posts 2 is a supplemental frame 15, shown as made of a single flat bar which has a connecting transverse horizontal portion 16. This portion 16 is bolted or otherwise fastened to a curved member 17, on the upper surface of which is a toothed rack 18. The curve of this rack is described from the center of the pin 4, and the rack is provided for the purpose of turning or swinging the frames 3 about on said pin, from side to side, to compensate for the tendency of the machine to skid or move laterally when being drawn along a side hill. To accomplish the required movement of the frames 3 about the pin 4 there is provided a shaft 19 (see Fig. 1) revoluble in suitable bearings 20, and having on its forward end a toothed pinion 21 that is adapted to mesh with the rack 18. To the rear end of this shaft is fixed a lever 22 that is adapted to engage, by means of a suitable latch, a notched sector 23 (see Fig. 4). The operator of the machine, by swinging this lever, may cause the pinion 21 to roll around on the rack 18, carrying with it the forward end of the frames 3 either to right or left, as required. Fixed to the under side of the frames 3, near their forward ends, are brackets 33, serving as supports for a housing 34 that incloses the portion 16 of the supplemental frame 15 and also the rack member 17. Rollers 35 are journaled in the housing 34, and are adapted to form antifriction supports for the bar 16 under circumstances which will be hereinafter more fully described. The draft pole or tongue 24 is supported between the frames 3, and therefore moves with them in a lateral direction. This pole 24 may be so arranged as to be capable of independent movement in a vertical plane, and to this end it is pivoted to and between said frames and has the rear portion preferably deflected downwardly, as shown at 25 in Fig. 2. A pivoted block or nut 26 arranged on the end 25 is internally threaded to receive a jack-screw 27, which latter extends downwardly from a bearing 28 pivoted on a transverse shaft 29 in suitable supports 30 fixed to the frames 3. A hand crank 32 is provided on the upper end of the jack-screw 27, and the driver may by turning this crank either raise or lower the forward end of the tongue 24, as may be required under certain conditions.

The harvester in the particular embodiment of the invention shown herewith is adapted to engage the vines of the plants in such a manner that they will be turned inwardly to a point where they may be severed by suitable cutters. At the same time the soil adjacent to the vines is pushed outwardly away from the sides of the machine, in order to leave a clean path for the wheels and to prevent stones or dirt from being pressed or forced inwardly by the wheels. For this purpose there is provided a pair of plows 36, one on either side of the machine, each of which is provided with an arm 37 that is pivoted at 38 to a convenient support, such as the supplemental frame 15. Each plow is provided with a ground wheel 39 so set that the bottom 40 of the plow is slightly above the surface of the ground on which said wheel runs. In order that the wheels 39 may always rest on the ground, and so keep the plows 36 at the required distance therefrom, a rod 41 is pivoted at 42 near the top of each plow and these rods extend through guides 43 that are in turn pivoted at 44 on the frame 15, and may be variously adjusted by means of a bolt 45 that is adapted to coöperate with holes or slots 46 in flat portions on the guides 43. Springs 47 pressing against the under sides of the guides 43 tend to force the wheels 39 into engagement with the ground, the rods 41 being of sufficient length to permit the plows to maintain the required position relatively to the ground regardless of the height of the machine from the latter, within the limits of adjustments of the levers 10. Extending rearwardly from each of the plows 36 is a wing 48 that tends to push the vines in the row toward the center, this action being further increased by rods 49 that are suitably fastened to these wings as by clips 50 (see Fig. 3), the rods on the two sides converging with reference to each other.

The mechanism for cutting off the vines at the required distance from the ground constitutes an important feature of this invention. The mechanism is best illustrated in Figs. 1 and 2. Revolubly mounted in the posts 2, and extending therethrough from top to bottom, are shafts 51 having at their upper ends forwardly-extending arms 52 that are connected by a transverse bar or rod 53. Fixed to the lower ends of the shafts 51 are blade holders 54, each having fixed in it a cutting blade 55, the cutting edge of which is suitably formed for the work required of it. A notched quadrant 56 supported on the transverse beam 1 has pivoted upon it at 57 a lever 58, and the forward end of this lever is connected at 59 with the bar 53. It will thus be seen that the shafts 51, the arms 52, the bar 53, and the levers 58 are all component parts of a mechanism for controlling the cutting blades, and by reference to Figs. 3 and 5 it will be seen that a movement of the lever 58 in one direction, as for instance toward the left, will move the bar 53 toward the right and swing the arms 52 in unison, causing the shafts 51 to turn an equal extent within the posts 2, this movement causing the cutting blades 55 to assume a position relative to the beam 1 that is different from the position shown in Fig. 1, in which the lever is illustrated as occupying the central position.

It will be noted by reference to Fig. 1 that the cutting blades 55 converge by extending from the bottoms of the posts 2 toward the longitudinal center line of the machine. The blades then form an angle between them of approximately 90 degrees, each blade when the lever 58 is in the central position forming an angle of approximately 45 degrees with the center line of the beam 1, this being found to be the most effective cutting angle for the blades in engaging the vines of beans, peas and similar plants. However this angle may be changed by adjustably connecting the arms 52 to the connecting bar 53 by shifting the pivot bolts 53$^a$ in the openings 53$^b$ in the bar 53.

The cutting blades 55 are adjustable as has just been described, in order to maintain approximately the same angle of the cutting edges with the row of vines, regardless of the character of the ground over which the machine is traveling. For instance, if the machine is traveling on level ground, it has no tendency to move away from the row of vines, and the cutting blades may then be set as in Fig. 1, and the wheels 6 may travel at equal distances from the row. If, however, the machine is being used on a side hill, there is a pronounced tendency, due to its weight and the weight of the driver of the machine, to slide or skid laterally, although the draft-animals may still travel parallel with the row of vines. When this occurs it becomes necessary for the driver to alter the position of the frames 3 and the tongue 24 relatively to the beam 1, and the cutting blades must be adjusted accordingly, that is, the blades should be so adjusted that each lies at approximately the same angle to the longitudinal center of the tongue 24 regardless of the position of the latter with respect to the frame of the machine. When the blades are so set they will occupy a position approximately as shown in Fig. 3, the driver having manipulated the lever 22 to shift the frames 3 and the lever 58 to shift the cutting blades.

The cutting blades, by reason of their convergence, tend to gather in the vines so that the latter will be more quickly severed, and this gathering action is rendered still more effective by the action of rods 60, which are fixed to the blade holders 54 and extend above and approximately parallel to the rear edges of the blades so as to be adjusted with the blades.

The general operation of the machine is as follows: Presuming the driver to be guiding the machine along a row of vines on level ground, the levers 10 will be so adjusted that the beam 1 is horizontal, as shown in the drawings, and therefore both the blades 55 will be the same height above the ground on which the wheels 6 travel. The pole 24 is adjusted by means of the crank 32 and the crank 27 to suit the height of the draft-animals. As the machine moves forwardly, the plows 36 will scrape away and turn outwardly part of the top soil, this plowing action providing a smooth path for the wheels 6. The tendency of the plows 36 to dig into the ground causes a forward and downward stress upon the supplemental frame 17, and this pull is taken up or received upon the rollers 35. The cutting blades 55 remain fixed at the relative angle shown in Fig. 1, so that the vines in the row are gathered between them and the rods 60 and are cleanly severed close to the ground by the cutters dragging across them.

If it becomes necessary to operate the machine on a side hill, the driver adjusts the various parts to suit this condition, by swinging the lever 22 to the required degree to maintain the frames 3 and the tongue 24 in the line of draft. Either one or both of the levers 10 are then manipulated to cause the machine to assume the required lateral slant relatively to the row, in order to maintain the cutting blades parallel with the ground, and the lever 58 is moved either to right or left, as required, which action, through the shafts 51 and connected parts, causes one of the cutting blades 55 to swing forwardly and one to swing rearwardly, the lever being stopped at such a point that each cutting blade will bear approximately the same angle to the row of vines. The machine may then progress along the row and the vines will be cut evenly and cleanly.

It will be noted by reference to Fig. 5 that the cutting blades, even when swung to the extreme limit of their travel, still bear approximately the same angular relation to each other, and, therefore, their effectiveness in cutting off the vines is not lessened by reason of this adjustment.

What I claim as my invention and desire to secure by Letters Patent is:—

1. An agricultural machine, comprising a wheeled frame, a pair of converging cutters mounted on said frame, draft means on said frame adjustable laterally with relation to the line of travel of the wheels, and mechanism for adjusting the cutters to correspond with the adjustment of the draft means.

2. An agricultural machine comprising a wheeled frame, a pair of rearwardly converging cutters mounted on said frame to swing about upright axes, and mechanism for moving one cutter forwardly about its axis as the other cutter moves rearwardly about its axis.

3. An agricultural machine comprising a wheeled frame, draft means on said frame adjustable laterally with reference to the line of travel of the wheels, a pair of rearwardly converging cutters mounted on said frame to swing about upright axes, and mechanism for adjusting the cutters about their axes so that the cutters may lie at substantially the same angles to the line of draft for any adjustment of the draft means.

4. An agricultural machine comprising a wheeled frame, a pair of upright shafts on the frame, a pair of cutters, one supported by each shaft, said cutters extending rearwardly from the shafts in converging relation, and connections between the shafts whereby one cutter is swung forwardly and the other cutter is swung rearwardly.

5. An agricultural machine comprising a frame, upright hollow posts on the frame, wheels adjustable vertically on said posts, shafts turning in the posts, cutters secured to the shafts, and connections between the shafts for adjusting the cutters.

6. An agricultural machine comprising a wheeled frame, a pair of rearwardly converging cutters mounted on said frame to swing about upright axes, mechanism for moving one cutter forwardly about its axis as the other cutter moves rearwardly about its axis, and gathering rods adjustable with said cutters.

7. An agricultural machine comprising a wheeled frame, a pair of rearwardly converging cutters, a pair of upright shafts on which said cutters are mounted, mechanism for turning the shafts to move one cutter forwardly about its axis, as the other cutter is moved rearwardly about its axis, and gathering rods supported on the shafts and extending rearwardly therefrom substantially parallel with the cutters.

8. An agricultural machine comprising a wheeled frame, a pair of clearing plows arranged to travel in a path in front of the wheels of the frame, a pair of rearwardly converging cutters arranged in the rear of the plows, and mechanism for simultaneously moving the cutters forwardly and rearwardly about upright axes.

9. An agricultural machine comprising a wheeled frame, a pair of clearing plows arranged to travel in paths in front of the wheels of the frame, a pair of rearwardly converging cutters arranged in the rear of the plows, mechanism for simultaneously moving the cutters forwardly and rearwardly about upright axes, and gathering rods extending from the plows and overlapping the forward ends of the cutters.

10. An agricultural machine comprising a wheeled frame, a pair of clearing plows arranged to travel in paths in front of the wheels of the frame, a pair of rearwardly converging cutters arranged in the rear of the plows, mechanism for simultaneously moving the cutters forwardly and rearwardly about upright axes, and gathering rods arranged substantially parallel with the cutters and adjustable with the latter.

11. An agricultural machine comprising a wheeled frame, a pair of rearwardly converging cutters mounted on said frame to swing about upright axes, and means for maintaining the cutters inclined toward each other at substantially the same angle during such swinging movement.

JOHN P. GOOSSEN.

Copies of this patent may be obtained for five cents each, by addressing the "Commissioner of Patents, Washington, D. C."